US012741473B2

(12) United States Patent
Shimada et al.

(10) Patent No.: US 12,741,473 B2
(45) Date of Patent: Sep. 22, 2026

(54) MEDIUM TRANSPORT DEVICE, RECORDING DEVICE, RECORDING SYSTEM, AND MEDIUM TRANSPORT METHOD

(71) Applicant: SEIKO EPSON CORPORATION, Tokyo (JP)

(72) Inventors: Chiaki Shimada, Okaya (JP); Takeru Oguchi, Chino (JP); Hiroshi Shiobara, Matsumoto (JP); Tatsuya Hosokawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 283 days.

(21) Appl. No.: 18/436,962

(22) Filed: Feb. 8, 2024

(65) Prior Publication Data

US 2024/0269998 A1 Aug. 15, 2024

(30) Foreign Application Priority Data

Feb. 9, 2023 (JP) ................................. 2023-018197

(51) Int. Cl.

| | |
|---|---|
| ***B41J 13/00*** | (2006.01) |
| ***B41J 2/165*** | (2006.01) |
| ***B41J 3/44*** | (2006.01) |
| ***B41J 11/00*** | (2006.01) |
| ***B41J 13/03*** | (2006.01) |
| ***B65H 5/06*** | (2006.01) |

(52) U.S. Cl.

CPC ........... *B41J 13/0018* (2013.01); *B41J 2/165* (2013.01); *B41J 3/44* (2013.01); *B41J 11/0095* (2013.01); *B41J 13/03* (2013.01); *B65H 5/062* (2013.01); *B65H 2404/1115* (2013.01); *B65H 2513/11* (2013.01); *B65H 2601/525* (2013.01); *B65H 2701/1311* (2013.01); *B65H 2701/1313* (2013.01)

(58) Field of Classification Search

CPC . B41J 13/0018; B41J 2/165; B41J 3/44; B41J 11/0095; B41J 13/03; B65H 5/062; B65H 2404/1115; B65H 2513/11; B65H 2601/525; B65H 2701/1311; B65H 2701/1313

See application file for complete search history.

(56) References Cited

U.S. PATENT DOCUMENTS

2022/0288952 A1* 9/2022 Yamagata .............. B41J 11/007

FOREIGN PATENT DOCUMENTS

JP 2006-240838 A 9/2006

* cited by examiner

*Primary Examiner* — Henok D Legesse
(74) *Attorney, Agent, or Firm* — WORKMAN NYDEGGER

(57) ABSTRACT

A medium transport device includes a first roller that transports a medium in a transport direction, and a control unit that controls the first roller. The control unit rotates the first roller at a first speed when the first roller transports a first medium. When a rear end of the first medium is located downstream of the first roller in the transport direction and a leading end of a second medium transported subsequently to the first medium is located upstream of the first roller in the transport direction, the control unit can perform a deceleration control of decelerating the first roller to a second speed slower than the first speed.

14 Claims, 7 Drawing Sheets

MEDIUM TRANSPORT DEVICE, RECORDING DEVICE, RECORDING SYSTEM, AND MEDIUM TRANSPORT METHOD

The present application is based on, and claims priority from JP Application Serial Number 2023-018197, filed Feb. 9, 2023, the disclosure of which is hereby incorporated by reference herein in its entirety.

BACKGROUND

1. Technical Field

The present disclosure relates to a medium transport device, a recording device, a recording system, and a medium transport method.

2. Related Art

For example, as described in JP-A-2006-240838, an image forming device is known that is an example of a recording device that performs printing by ejecting ink, which is an example of a liquid, from a recording head onto a sheet, which is an example of a medium. The image forming device includes a device main body and a plurality of paper feed trays.

Each of the paper feed trays includes a transport roller, which is an example of a first roller, a sheet transport motor, and a sheet sensor. The paper feed tray rotates the transport roller while the sheet sensor detects the sheet. The transport roller transports the sheet and transfers the sheet to another paper feed tray or the device main body.

In the image forming device disclosed in JP-A-2006-240838, power consumption is reduced by driving only the sheet transport motor of the paper feed tray in which the sheet is present. However, in the image forming device disclosed in JP-A-2006-240838, for example, a case in which a plurality of the sheets are continuously fed is not considered, and there is demand for further reduction in the power consumption.

SUMMARY

A medium transport device for solving the problem described above includes a first roller configured to transport a medium in a transport direction, and a control unit configured to control the first roller, in which the control unit rotates the first roller at a first speed when the first roller transports a first medium, and is configured to perform a deceleration control of decelerating a rotation of the first roller to a second speed slower than the first speed when a rear end of the first medium is located downstream of the first roller in the transport direction and a leading end of a second medium transported subsequently to the first medium is located upstream of the first roller in the transport direction.

A recording device for solving the problem described above includes the medium transport device having the configuration described above, and a recording unit configured to perform recording on the medium transported by the medium transport device, in which based on a recording condition, the control unit determines whether to perform the deceleration control.

A recording system for solving the problem described above includes a recording device including the medium transport device having the configuration described above and a recording unit configured to perform recording on the medium transported by the medium transport device, and a post-processing device configured to perform post-processing on the medium subjected to recording by the recording device, in which based on a post-processing condition, the control unit determines whether to perform the deceleration control.

A medium transport method for solving the problem described above includes transporting a first medium in a transport direction by rotating a first roller at a first speed, and decelerating the first roller to a second speed slower than the first speed when a rear end of the first medium is located downstream of the first roller in the transport direction and a leading end of a second medium transported subsequently to the first medium is located upstream of the first roller in the transport direction.

DESCRIPTION OF EMBODIMENTS

Embodiment

Figure 1:
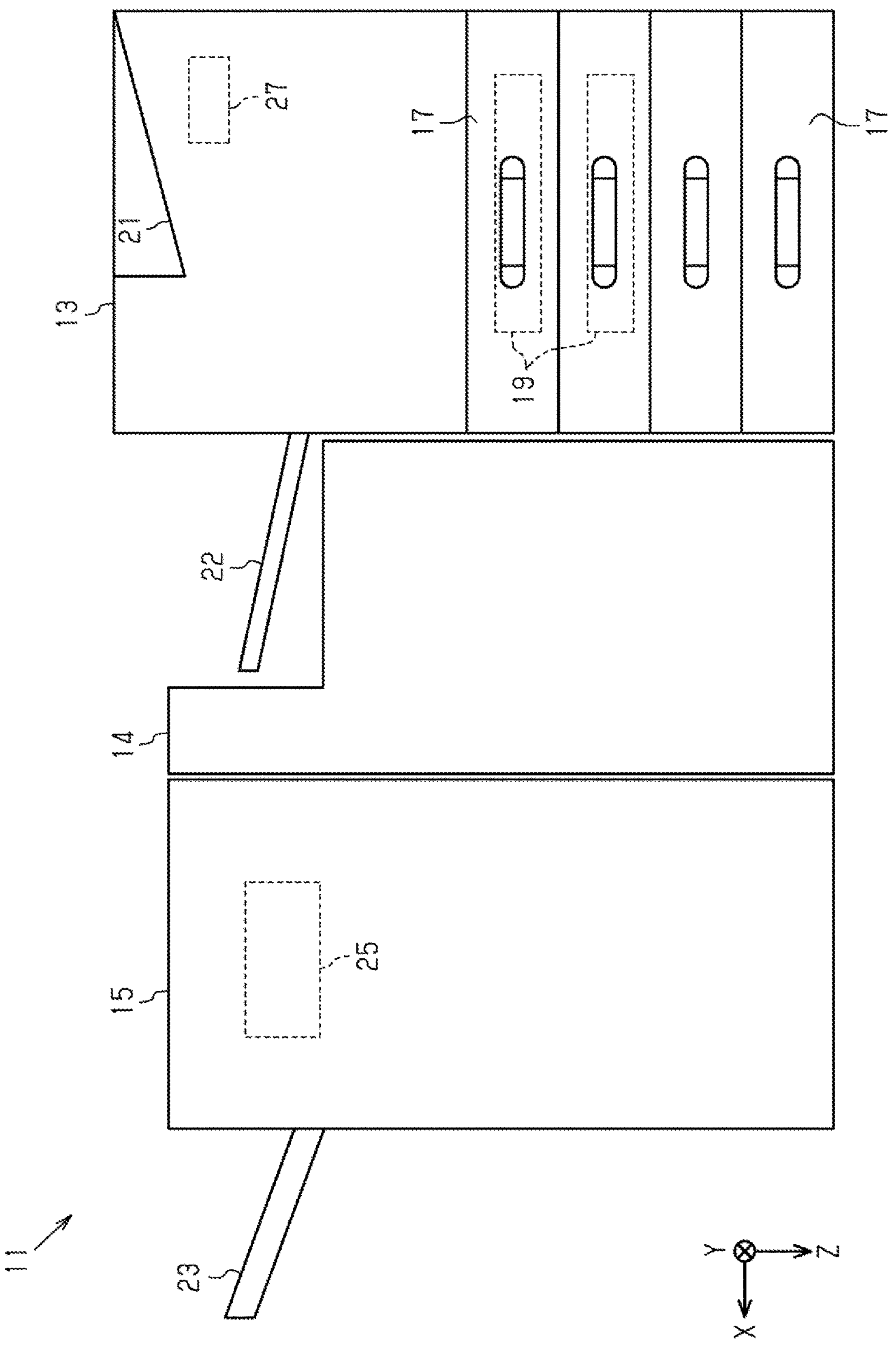
FIG. 1 is a schematic view of an embodiment of a recording system.

Hereinafter, an embodiment of a medium transport device, a recording system including a recording device, a medium transport method, and a cleaning method will be described with reference to the drawings. In the drawings, assuming that a recording device 11 is placed on a horizontal plane, a Z-axis represents the direction of gravity, and X- and Y-axes represent directions along the horizontal plane. The X-axis, the Y-axis, and the Z-axis are perpendicular to each other.

Recording System

As illustrated in FIG. 1, the recording system 11 may include a recording device 13, an intermediate device 14, and a post-processing device 15. The recording device 13, the intermediate device 14, and the post-processing device 15 may be provided adjacent to each other.

The recording device 13 may include one or more medium accommodation units 17. The medium accommodation unit 17 can accommodate a plurality of media 19 in a stacked state.

The recording system 11 may include one or more stackers. For example, the recording device 13 may include a first stacker 21 and a second stacker 22. For example, the post-processing device 15 may include a third stacker 23. Each of the first stacker 21 to the third stacker 23 receives the medium 19 that has been subjected to recording.

The recording device 13 is, for example, an ink jet-type printer that records an image by ejecting ink, which is an example of a liquid, onto the medium 19.

The intermediate device 14 transports the medium 19 that has been subjected to recording by the recording device 13, to the post-processing device 15.

The post-processing device 15 performs post-processing on the medium 19 that has been subjected to recording by the recording device 13. The post-processing device 15 includes a post-processing unit 25. The post-processing unit 25 may perform, for example, stapling processing of binding a plurality of the media 19 with a staple. The post-processing unit 25 may perform punching processing of punching a hole in the medium 19, shifting processing of shifting the media 19 for collation per unit and discharging the media 19, or the like.

The recording system 11 may include one or more control units 27. The control unit 27 may be included in at least one of the recording device 13, the intermediate device 14, and the post-processing device 15. The control unit 27 integrally controls driving of each mechanism of the recording system 11 or the device provided with the control unit 27. The control unit 27 controls various operations performed by the recording system 11 or the device provided with the control unit 27.

The control unit 27 may be configured as a circuit including α: one or more processors that perform various processing in accordance with a computer program, β: one or more dedicated hardware circuits that perform at least some of the various processing, or γ: a combination thereof. The hardware circuit is, for example, an application-specific integrated circuit. The processor includes a CPU and a memory such as a RAM or a ROM, and the memory stores program codes or instructions configured to cause the CPU to perform processing. The memory, that is, a computer-readable medium, includes any readable medium that can be accessed by a general purpose or special purpose computer.

Recording Device and Medium Transport Device

Figure 2:
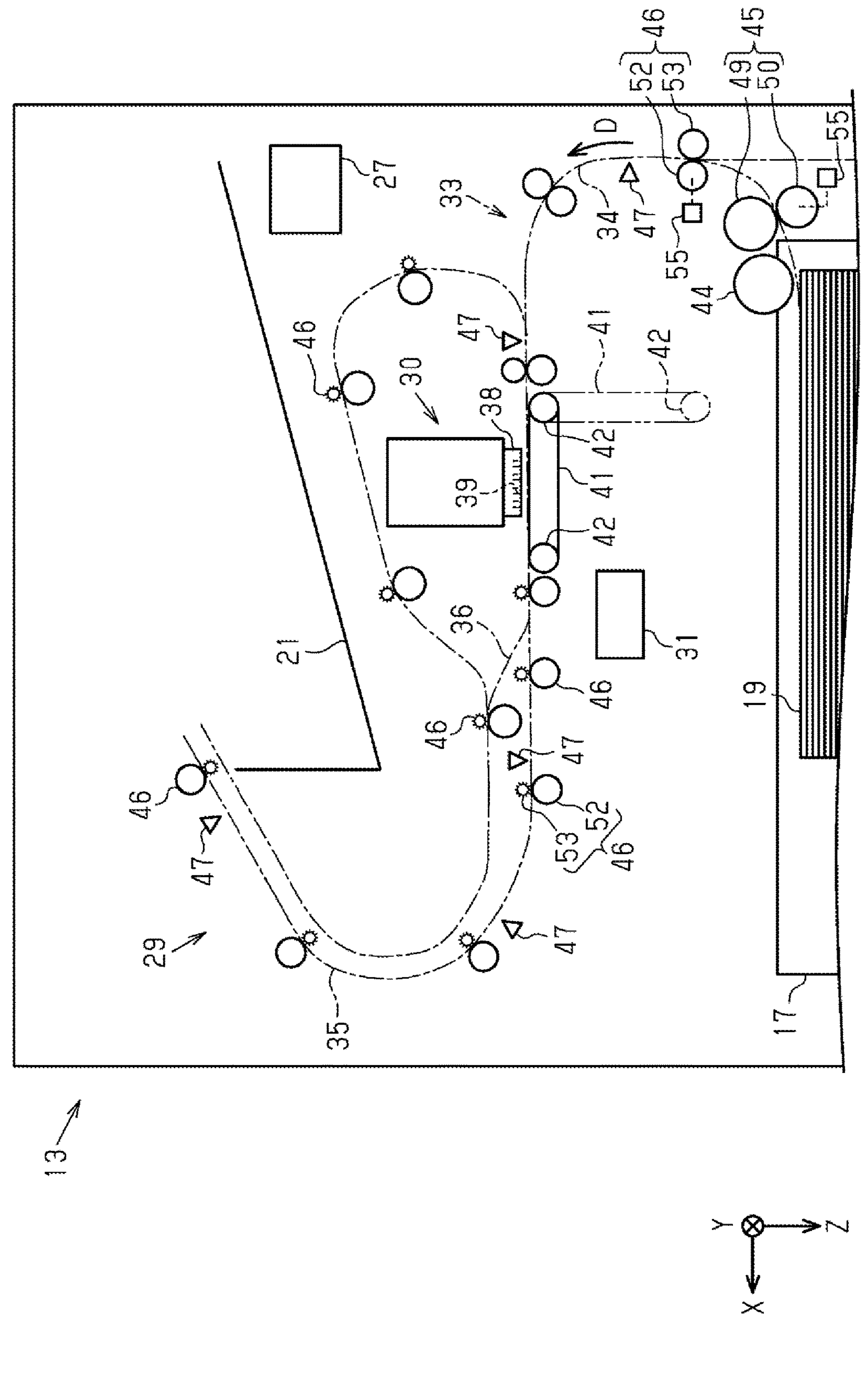
FIG. 2 is a schematic view of a recording device.

As illustrated in FIG. 2, the recording device 13 may include a medium transport device 29, a recording unit 30, and a maintenance unit 31. The medium transport device 29 includes the control unit 27.

The medium transport device 29 may include a transport path 33 along which the medium 19 is transported. In FIG. 2, the transport path 33 is indicated by a one-dot chain line. In the embodiment, a direction in which the medium 19 is transported is also referred to as a transport direction D. The transport direction D is a direction along the transport path 33. In the embodiment, upstream is upstream in the transport direction D, and downstream is downstream in the transport direction D.

The transport path 33 may include a supply path 34, a discharge path 35, and an inversion path 36.

The supply path 34 is a path through which the medium 19 before recording passes. The supply path 34 is a path coupling the medium accommodation unit 17 and the recording unit 30.

The discharge path 35 is a path through which the medium 19 that has been subjected to recording passes. The discharge path 35 is a path coupling the recording unit 30 and, for example, the first stacker 21. The discharge path 35 may be a path leading to the second stacker 22, the intermediate device 14, or the post-processing device 15.

The inversion path 36 is a path for returning the medium 19 one side of which has been subjected to recording, to upstream of the recording unit 30. The medium 19 transported through the inversion path 36 is inverted so that a surface of the medium 19 that has been previously subjected to recording faces downward. With respect to the medium 19 returned to upstream of the recording unit 30, the recording is performed on a back surface thereof, which has not been subjected to recording, with the back surface facing the recording unit 30. In other words, the recording device 13 may be capable of performing the recording on both sides of the medium 19.

The recording unit 30 perform the recording on the medium 19 transported by the medium transport device 29. The recording unit 30 may include an ejection unit 38 that ejects the liquid onto the medium 19. The ejection unit 38 may include a plurality of nozzles 39 that eject the liquid. The recording unit 30 may perform the recording by ejecting the liquid.

The medium transport device 29 may include an endless transporting belt 41 and a pair of pulleys 42. The transporting belt 41 is stretched around the pair of pulleys 42. The transporting belt 41 faces the recording unit 30 with the transport path 33 interposed therebetween. The transporting belt 41 supports a portion of the medium 19 in a flat state. The transporting belt 41 transports the medium 19 by rotating with the medium 19 adhered to the transporting belt 41.

The transporting belt 41 is provided so as to be movable between a supporting position indicated by a solid line in FIG. 2 and a retracted position indicated by a two-dot chain line in FIG. 2 by rotating around one of the pulleys 42. The supporting position is a position at which the medium 19 is supported so as to face the recording unit 30. The retracted position is a position at which the transporting belt 41 is separated from the recording unit 30.

The maintenance unit 31 may be provided so as to be movable in a state in which the transporting belt 41 is located at the retracted position. The maintenance unit 31 may perform maintenance of the recording unit 30 by moving to a position facing or in contact with the recording unit 30. The control unit 27 can perform the maintenance of the recording unit 30 by controlling the maintenance unit 31.

The maintenance unit 31 may perform, for example, flushing as the maintenance of the recording unit 30. The flushing is a maintenance operation that performs ejection of liquid droplets from the nozzles 39 in a forceful manner. The maintenance unit 31 may receive the liquid ejected from the nozzles 39 as a result of the flushing. The flushing is performed, for example, before the recording, during the recording, or after the recording.

The medium transport device 29 may include a feed roller 44, a separation unit 45, a transport unit 46, and a detector 47. The medium transport device 29 may include a plurality of the feed rollers 44, a plurality of the separation units 45, a plurality of the transport units 46, and a plurality of the detectors 47. The number of the feed rollers 44 and the number of the separation units 45 may be the same as the number of the medium accommodation units 17. The feed roller 44, the separation unit 45, the transport unit 46, and the detector 47 are each provided along the transport path 33.

The feed roller 44 feeds the medium 19 to the transport path 33 by rotating in a state of being in contact with the medium 19 accommodated in the medium accommodation unit 17. The feed roller 44 is located at an upstream end of the transport path 33.

The separation unit 45 may include a separation driving roller 49, which is an example of a roller, and a separation driven roller 50, which is an example of a facing member. The separation driving roller 49 and the separation driven roller 50 are in contact with each other when the medium 19 is not present therebetween.

A rotational load is applied to the separation driven roller 50, for example, by a torque limiter. When the separation unit 45 nips a plurality of the media 19, the separation driven roller 50 is less likely to be driven to rotate in response to the rotation of the separation driving roller 49. As a result, the separation unit 45 separates, one by one, the media 19 fed by the feed roller 44. The medium transport device 29 transports the medium 19 using the separation driving roller 49 and the separation driven roller 50.

The transport unit 46 may include a transport driving roller 52, which is an example of the roller, and a transport driven roller 53, which is an example of the facing member. The transport driving roller 52 and the transport driven roller 53 are in contact with each other when the medium 19 is not present therebetween.

The transport driving roller 52 and the transport driven roller 53 transport the medium 19 by the transport driving roller 52 rotating in a state in which the medium 19 is nipped therebetween. The medium transport device 29 transports the medium 19 using the transport driving roller 52 and the transport driven roller 53.

The medium transport device 29 may include a displacement unit 55. The medium transport device 29 may include a plurality of the displacement units 55. The displacement unit 55 may cause the separation driving roller 49 and the separation driven roller 50 to be relatively separated from each other and to come into contact with each other. The displacement unit 55 may move at least one of the separation driving roller 49 and the separation driven roller 50. The separation driven roller 50 faces the separation driving roller 49.

The displacement unit 55 may cause the transport driving roller 52 and the transport driven roller 53 to be relatively separated from each other and to come into contact with each other. The displacement unit 55 may move at least one of the transport driving roller 52 and the transport driven roller 53. The transport driven roller 53 faces the transport driving roller 52.

Of a plurality of the transport driven rollers 53, for example, the transport driven roller 53 provided at the supply path 34 may have a rod shape. By using the rod-shaped transport driven roller 53, it is possible to stably transport the medium 19 before the recording.

The transport driven roller 53 may be a toothed roller including a plurality of teeth capable of coming into point contact with the medium 19 on a circumferential surface thereof. Of the plurality of transport driven rollers 53, for example, the transport driven rollers 53 provided at the discharge path 35 and the inversion path 36 may be the toothed rollers. In particular, in the ink jet-type printer as in this embodiment, in order to suppress transfer of the ink to the roller, the roller coming into contact with the surface that has been subjected to recording immediately before may be the toothed roller. Since the contact area with the medium 19 is reduced by using the toothed roller, it is possible to suppress a deterioration in recording quality due to transport.

Figure 3:
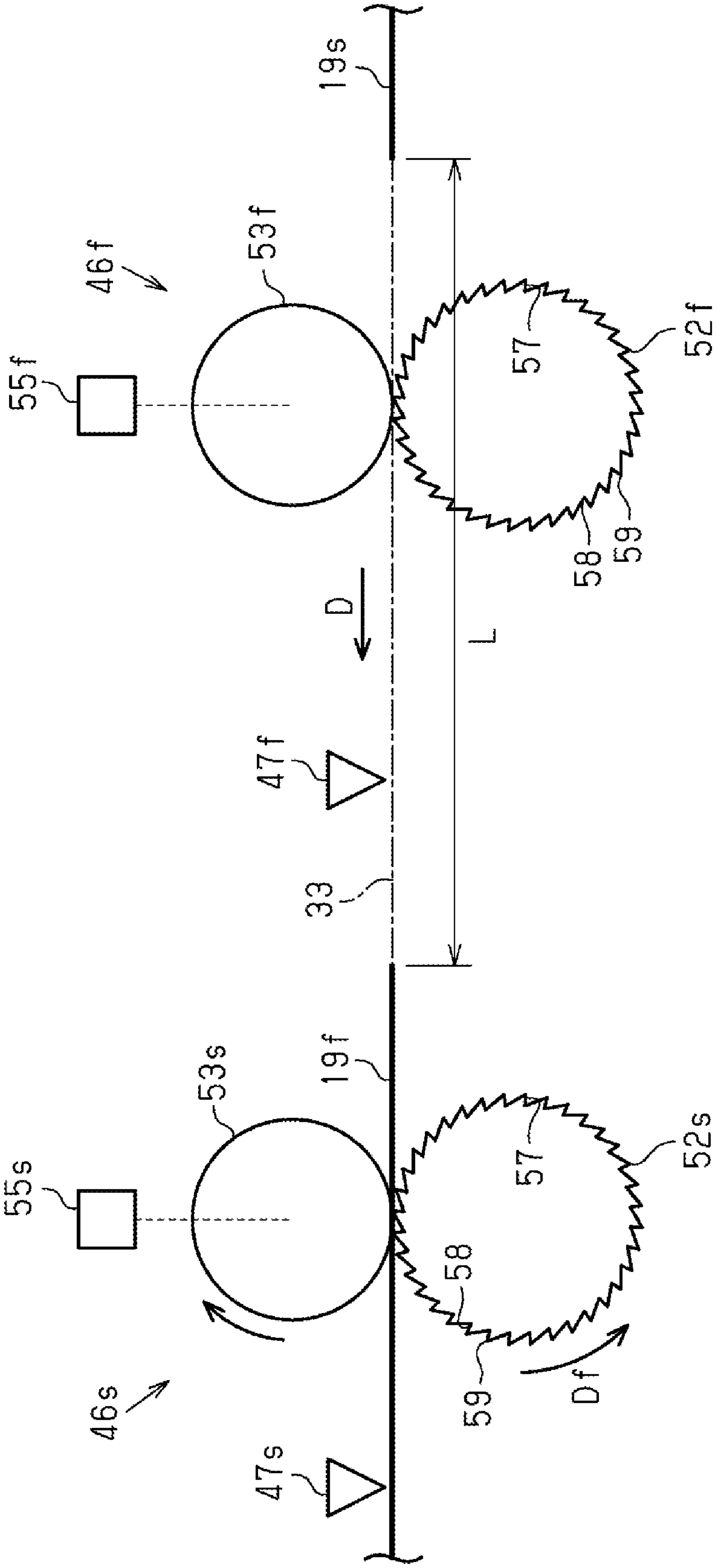
FIG. 3 is a schematic view of a first transport unit and a second transport unit.

As illustrated in FIG. 3, two of the media 19 that are continuously fed are also referred to as a first medium **19*f* and a second medium 19*s*. The first medium 19*f* is the medium 19 transported in advance of the second medium 19*s*. The second medium 19*s* is the medium 19 transported subsequently to the first medium 19*f***.

In FIG. 3, two of the plurality of transport units 46 that are adjacent to each other in the transport direction D and two of the plurality of detectors 47 that are adjacent to each other in the transport direction D are illustrated. The two transport units 46 and the two detectors 47 may be located at any one of the supply path 34, the discharge path 35, and the inversion path 36 of the transport path 33, or may be located at a plurality of the paths.

Of the two transport units 46, the transport unit 46 located upstream in the transport direction D is also referred to as a first transport unit **46*f*, and the transport unit 46 located downstream in the transport direction D is also referred to as a second transport unit 46*s*. The second transport unit 46*s* is provided downstream of the first transport unit 46*f*** in the transport direction D.

Of the two detectors 47, the detector 47 located upstream in the transport direction D is also referred to as a first detector **47*f*, and the detector 47 located downstream in the transport direction D is also referred to as a second detector 47*s*. The first detector 47*f* is provided upstream of the second transport unit 46*s*. The first detector 47*f* is provided between the first transport unit 46*f* and the second transport unit 46*s* in the transport direction D. The second detector 47*s* is provided downstream of the second transport unit 46*s***.

The transport driving roller 52 included in the first transport unit **46*f* is also referred to as a first roller 52*f*, and the transport driven roller 53 included in the first transport unit 46*f* is also referred to as a first facing member 53*f*. The first transport unit 46*f* transports the medium 19 using the first roller 52*f* and the first facing member 53*f*. The first roller 52*f* transports the medium 19 in the transport direction D. The first facing member 53*f*** may be the toothed roller.

The transport driving roller 52 included in the second transport unit **46*s* is also referred to as a second roller 52*s*, and the transport driven roller 53 included in the second transport unit 46*s* is also referred to as a second facing member 53*s*. The second transport unit 46*s* transports the medium 19 using the second roller 52*s* and the second facing member 53*s*. The second roller 52*s* downstream of the first roller 52*f* in the transport direction D and transports the medium 19 in the transport direction D. The second facing member 53*s* is provided downstream of the first facing member 53*f* in the transport direction D. The second facing member 53*s*** may be the toothed roller.

The first roller **52*f* and the second roller 52*s* may be rotatable in a forward rotation direction Df and a reverse rotation direction opposite to the forward rotation direction Df. In the surfaces of the first roller 52*f* and the second roller 52*s*, a plurality of grooves 57** whose directions of openings are aligned with each other may be formed.

The groove 57 may be formed over the entire circumference. The groove 57 may be formed over an axial direction, or a plurality of the grooves 57 may be formed in the axial direction. The groove 57 may be formed in a scale-like shape. The groove 57 can be formed by polishing, for example. The groove 57 is formed obliquely with respect to the surface. When the first roller **52*f* and the second roller 52*s* rotate in the forward rotation direction Df, a bottom 58 of the groove 57 precedes a mouth 59 of the groove 57. In other words, the forward rotation direction Df is a direction in which the bottom 58 of the groove 57 precedes the mouth 59 of the groove 57. In the forward rotation direction Df, the width of the bottom 58 may be smaller than the width of the mouth 59. The first roller 52*f* and the second roller 52*s* transport the medium 19** in the transport direction D by rotating in the forward rotation direction Df.

The displacement unit 55 that causes the first roller **52*f* and the first facing member 53*f* to be relatively separated from each other and to come into contact with each other is also referred to as a first displacement unit 55*f*. For example, the first displacement unit 55*f* moves the first facing member 53*f***.

The displacement unit 55 that causes the second roller **52*s* and the second facing member 53*s* to be relatively separated from each other and to come into contact with each other is also referred to as a second displacement unit 55***s*. For example, the second displacement unit 55*s* moves the second facing member 53*s*.

Medium Transport Method

Figure 4:
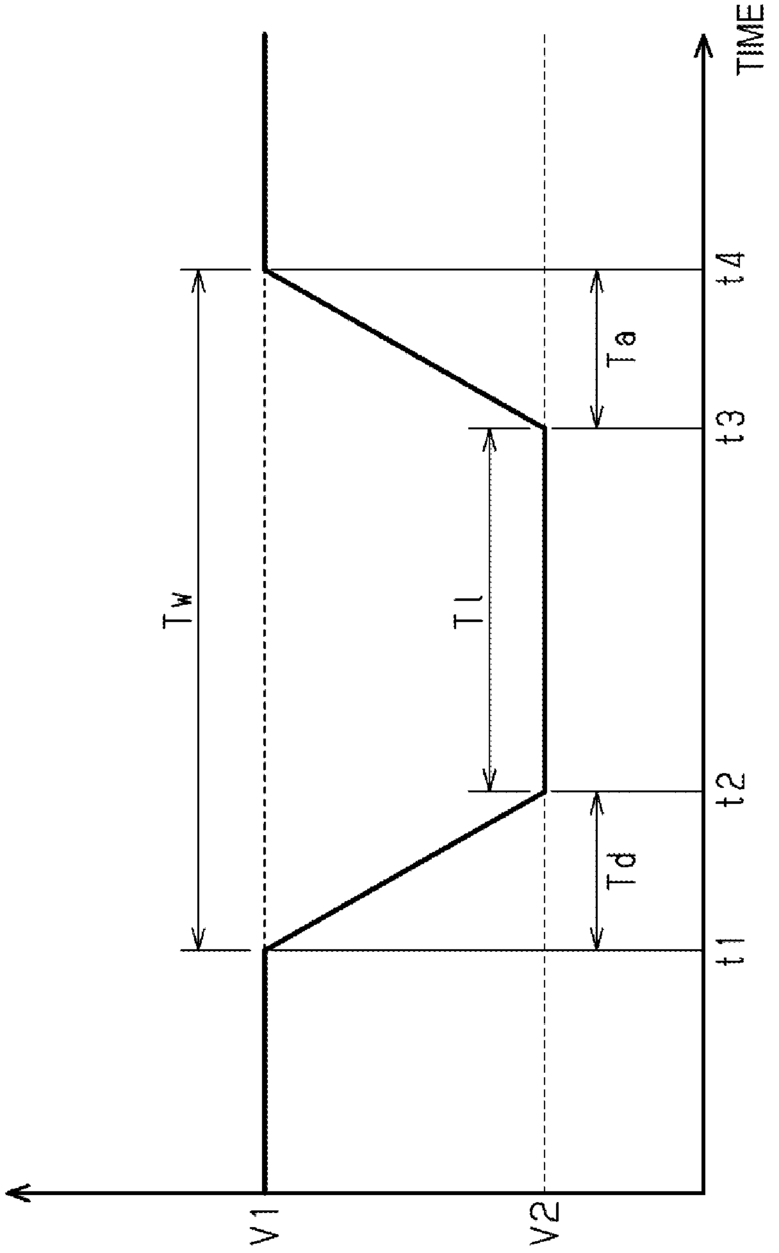
FIG. 4 is a graph showing a deceleration control.

As illustrated in FIGS. 3 and 4, the control unit 27 may control the first roller 52*f* and the second roller 52*s*. When the first roller 52*f* transports the first medium 19*f*, the control unit 27 rotates the first roller 52*f*, for example, at a first speed V1 until a first time t1. The control unit 27 transports the first medium 19*f* in the transport direction D by rotating the first roller 52*f* at the first speed V1. The first speed V1 may be set in accordance with, for example, the recording accuracy of the recording unit 30, a time required to dry the recorded medium 19, or the like. The control unit 27 rotates the first roller 52*f* at the first speed V1 even after a fourth time t4 after which the first roller 52*f* transports the second medium 19*s*. The first speed V1 is a transport speed of the medium 19.

The control unit 27 controls the second roller 52*s*. When the second roller 52*s* transports the first medium 19*f*, the control unit 27 rotates the second roller 52*s* at the first speed V1. The control unit 27 transports the second medium 19*s* in the transport direction D by rotating the second roller 52*s* at the first speed V1. The control unit 27 also causes the second roller 52*s* to rotate at the first speed V1 even when the second roller 52*s* transports the second medium 19*s*.

When the rear end of the first medium 19*f* passes through the first roller 52*f* at the first time t1, the control unit 27 decelerates the first roller 52*f* to a second speed V2, which is slower than the first speed V1. Note that although the second speed V2 is higher than 0 in FIG. 4, the second speed V2 may be 0. The deceleration may be performed by stopping a motor (not illustrated) that drives the first roller 52*f*, or by interrupting transmission of the driving force using a clutch, for example.

When the rear end of the first medium 19*f* is located downstream of the first roller 52*f* in the transport direction D and the leading end of the second medium 19*s* is located upstream of the first roller 52*f* in the transport direction D, the control unit 27 can perform a deceleration control to decelerate the first roller 52*f*. The control unit 27 can perform the deceleration control of the first roller 52*f* during a period from the first time t1 at which the rear end of the first medium 19*f* is positioned at the first roller 52*f* to the fourth time t4 at which the leading end of the second medium 19*s* is positioned at the first roller 52*f*. While the second roller 52*s* is transporting the first medium 19*f*, the control unit 27 may perform the deceleration control at the first roller 52*f*. At this time, when the first displacement unit 55*f* is provided, the first roller 52*f* may be decelerated before the rear end of the first medium 19*f* passes through the first roller 52*f* by separating the first roller 52*f* and the first facing member 53*f* from each other using the first displacement unit 55*f*. Accordingly, a longer deceleration time period Td with respect to a distance L between the first medium 19*f* and the second medium 19*s* can be secured.

The control unit 27 may determine whether to perform the deceleration control, based on the distance L between the rear end of the first medium 19*f* and the leading end of the second medium 19*s*, and the first speed V1. The distance L is the length of the transport path 33 from the rear end of the first medium 19*f* to the leading end of the second medium 19*s*.

The control unit 27 may calculate an interval time period Tw by dividing the distance L by the first speed V1. The interval time period Tw is a time period from the first time t1 at which the first medium 19*f* passes through the first roller 52*f* to the fourth time t4 at which the second medium 19*s* reaches the first roller 52*f*.

The control unit 27 may acquire the interval time period Tw based on a detection result of the detector 47. For example, the control unit 27 may set, as the interval time period Tw, a time period from when the detector 47 detects the rear edge of the first medium 19*f* to when the detector 47 detects the leading edge of the second medium 19*s*.

As shown in FIG. 4, the control unit 27 may calculate a low-speed time period T1 by subtracting the deceleration time period Td and an acceleration time period Ta from the interval time period Tw. The deceleration time period Td is a time period required to decelerate the first roller 52*f* from the first speed V1 to the second speed V2. When the speed of the first roller 52*f* is decelerated from the first time t1, the speed of the first roller 52*f* becomes the second speed V2 at a second time t2 after the deceleration time period Td elapses. The control unit 27 accelerates the first roller 52*f* at a third time t3 at which the low-speed time period T1 elapses from the second time t2. The third time t3 is a time preceding the fourth time t4 by the acceleration time period Ta.

The acceleration time period Ta is a time period required to return the speed of the first roller 52*f* from the second speed V2 to the first speed V1. The deceleration time period Td and the acceleration time period Ta are determined based on the first speed V1, the second speed V2, characteristics of the motor for driving the first roller 52*f*, characteristics of a transmission unit for transmitting the driving force, and the like. However, the deceleration time period Td and the acceleration time period Ta may be set freely based on other conditions. The deceleration time period Td and the acceleration time period Ta may be different from each other. Specifically, when the first roller 52*f* decelerated to the second speed V2 is accelerated to the first speed V1, the first roller 52*f* may be accelerated at an accelerating rate greater than the absolute value of the accelerating rate applied when the first roller 52*f* is decelerated from the first speed V1 to the second speed V2.

For example, the control unit 27 may perform the deceleration control when the sum of the deceleration time period Td and the acceleration time period Ta is shorter than the interval time period Tw. For example, the control unit 27 may perform the deceleration control when the low-speed time period T1 is longer than a preset threshold time period. In other words, when the low-speed time period T1, during which the speed of the first roller 52*f* is set at the second speed V2, cannot be secured for the threshold time period, the control unit 27 does not need to perform the deceleration control.

The control unit 27 may determine whether to perform the deceleration control, based on a recording condition. For example, when performing the recording with high accuracy setting, the first speed V1 may be made slower than when performing the recording with low accuracy setting. The control unit 27 may perform the deceleration control when performing the recording with the high accuracy setting. For example, when performing the recording on both sides of the medium 19, the distance L may be made longer than when performing the recording on one side. The control unit 27 may perform the deceleration control when performing the recording on both sides of the medium 19, and need not necessarily perform the deceleration control when performing the recording on one side of the medium 19. For example, when performing the recording in a high-speed mode, the distance L may be made shorter than when performing the recording in a low-speed mode. The control unit 27 may perform the deceleration control in the low-speed mode, and need not necessarily perform the deceleration control in the high-speed mode.

The control unit 27 may determine whether to perform the deceleration control, based on execution of the maintenance. When the maintenance of the recording unit 30 is performed after performing the recording on the first medium 19*f* and before performing the recording on the second medium 19*s*, a timing of feeding the second medium 19*s* may be delayed. In other words, when performing the maintenance, the distance L and the interval time period Tw may be made longer than when not performing the maintenance. When the maintenance is performed during a period between performing the recording on the first medium 19*f* and performing the recording on the second medium 19*s*, the control unit 27 may perform the deceleration control of the roller positioned between the first medium 19*f* and the second medium 19*s*.

The control unit 27 may determine whether to perform the deceleration control, based on a post-processing condition. When performing the post-processing on the first medium 19*f* and the second medium 19*s*, the timing of feeding the second medium 19*s* may be delayed. In other words, when performing the post-processing, the distance L and the interval time period Tw may be made longer than when not performing the post-processing. When the post-processing is performed during the period between performing the recording on the first medium 19*f* and performing the recording on the second medium 19*s*, the control unit 27 may perform the deceleration control of the roller positioned between the first medium 19*f* and the second medium 19*s*.

The control unit 27 may determine whether to perform the deceleration control in consideration of a plurality of the recording conditions. The control unit 27 may determine whether to perform the deceleration control in consideration of contents of the maintenance and the post-processing. The control unit 27 may determine whether to perform the deceleration control, based on a combination of at least one of the recording condition, the execution of the maintenance, and the post-processing condition.

The deceleration control may include a first deceleration control and a second deceleration control. The control unit 27 may determine whether to perform the first deceleration control or the second deceleration control, based on the distance L and the first speed V1. Specifically, the control unit 27 may determine the deceleration control to be performed by using the interval time period Tw calculated based on the distance L and the first speed V1.

In the first deceleration control, the second speed V2 is greater than 0. In the second deceleration control, the second speed V2 is 0. In other words, in the second deceleration control, the control unit 27 may stop the first roller 52*f*. A second deceleration time period of the second deceleration control is longer than a first deceleration time period of the first deceleration control. A second acceleration time period of the second deceleration control is longer than a first acceleration time period of the first deceleration control. The control unit 27 may perform the second deceleration control when the sum of the second deceleration time period and the second acceleration time period is shorter than the interval time period Tw. The control unit 27 may perform the first deceleration control when the sum of the second deceleration time period and the second acceleration time period is equal to or greater than the interval time period Tw and the sum of the first deceleration time period and the first acceleration time period is shorter than the interval time period Tw.

In the first deceleration control, the second speed V2 may be changeable in a plurality of stages. For example, the second speed V2 may be set by a user.

In the first deceleration control, the second speed V2 may be changeable in a stepless manner. For example, when the deceleration time period Td and the acceleration time period Ta are the same, the control unit 27 may set, as the deceleration time period Td, a half of a time period obtained by subtracting the low-speed time period T1 from the interval time period Tw. The low-speed time period T1 may be 0. The control unit 27 may stop the deceleration after the deceleration time period Td elapses, and further, after the low-speed time T1 elapses, may accelerate the first roller 52*f*. The second speed V2 may be a speed obtained at a time when the deceleration time period Td elapses.

Figure 5:
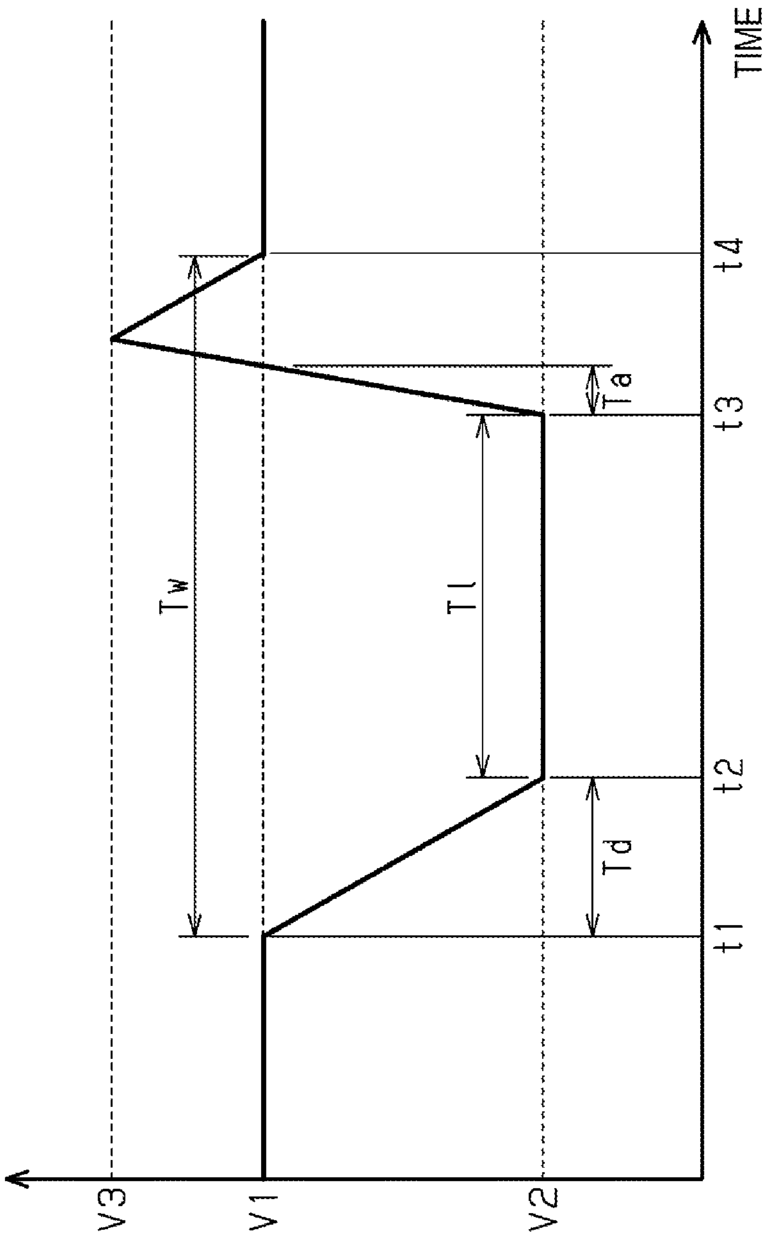
FIG. 5 is a graph showing the deceleration control and an acceleration control.

As shown in FIG. 5, the control unit 27 may cause the acceleration time period Ta after the third time t3, to be shorter than the deceleration time period Td. The control unit 27 may end the acceleration of the first roller 52*f* before the fourth time t4. When the first roller 52*f* decelerated to the second speed V2 is accelerated to the first speed V1, the control unit 27 may accelerate the first roller 52*f* at an accelerated rate greater than the absolute value of the accelerated rate applied when the first roller V2 is decelerated from the first speed V1 to the second speed V2.

The control unit 27 may perform the deceleration control and an acceleration control during the interval time period Tw from the first time t1 to the fourth time t4. For example, after performing the deceleration control, at the third time t3 at which the leading end of the second medium 19*s* is located upstream of the first roller 52*f* in the transport direction D, the control unit 27 can perform the acceleration control in which the first roller 52*f* is rotated at a third speed V3 faster than the first speed V1.

Cleaning Operation

As illustrated in FIG. 2, the control unit 27 can perform a cleaning operation of at least one of the separation unit 45 and the transport unit 46. When a foreign material 61 illustrated in FIG. 7, such as paper powder or dust, adheres to the transport driving roller 52 and the separation driving roller 49, the transport driving roller 52 and the separation driving roller 49 may slip with respect to the medium 19. When the slippage occurs, transport of the medium 19 is delayed. In particular, when the transport driving roller 52 and the separation driving roller 49 include the grooves 57, the foreign material 61 is easily accumulated. Thus, by performing the cleaning operation, the medium transport device 29 removes the foreign material 61 adhering to at least one of the transport driving roller 52 and the separation driving roller 49.

The control unit 27 may perform the cleaning operation of rotating the separation driving roller 49 in a state in which the separation driving roller 49 and the separation driven roller 50 are separated from each other. The separation driving roller 49 transports the medium 19 before the recording is performed thereon by the recording unit 30.

The control unit 27 may perform the cleaning operation of rotating the transport driving roller 52 in a state in which the transport driving roller 52 and the transport driven roller 53 are separated from each other. The control unit 27 may perform the cleaning operation for some of the transport units 46. For example, the control unit 27 may perform the cleaning operation on the transport unit 46 provided at the supply path 34. The transport driving roller 52 of the supply path 34 transports the medium 19 before the recording is performed thereon by the recording unit 30.

Hereinafter, the cleaning operation of the transport unit 46 will be described.

When transporting the medium 19, the control unit 27 causes the transport driving roller 52 to rotate at the first speed V1, which is an example of the transport speed. During the cleaning operation, the control unit 27 may cause the transport driving roller 52 to rotate at the third speed V3, which is faster than the first speed V1.

Figure 6:
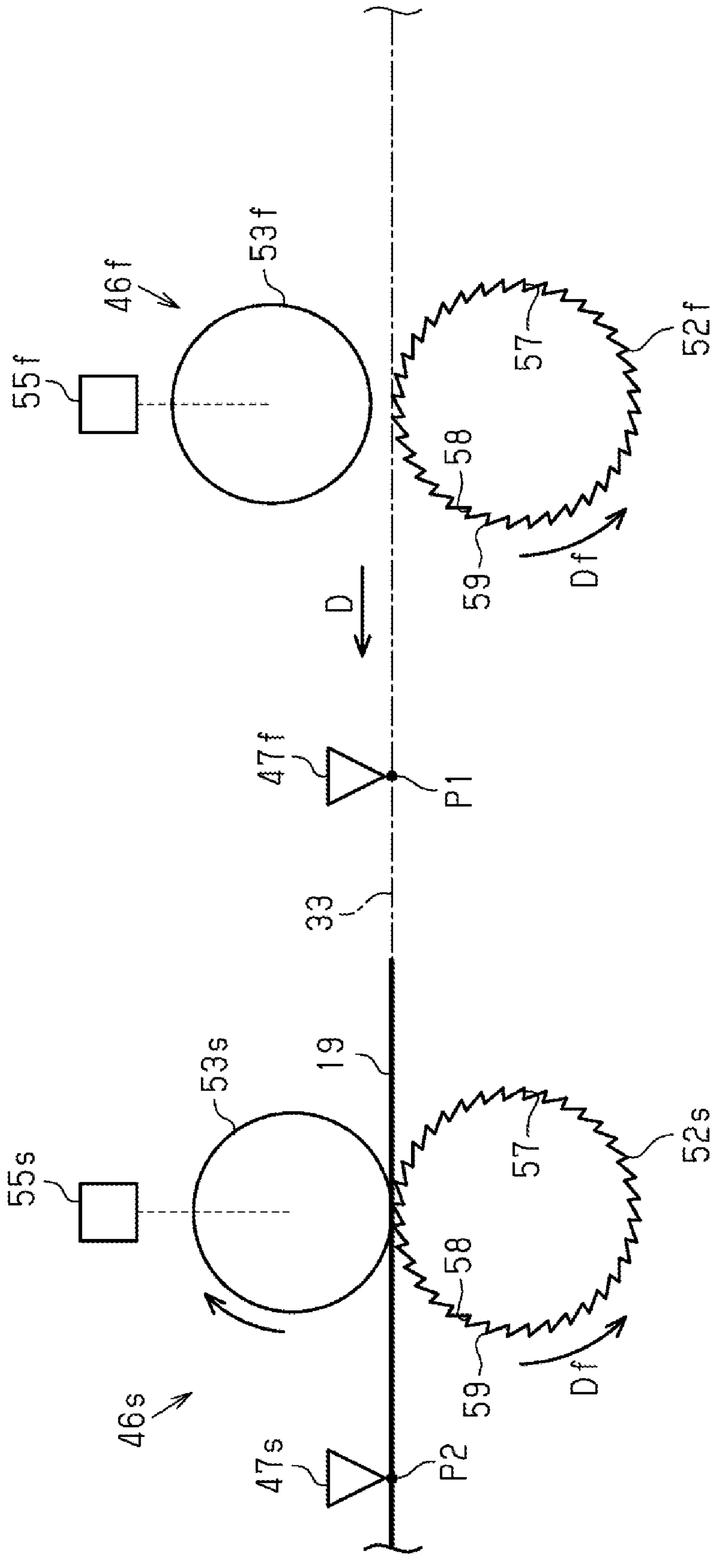
FIG. 6 is a schematic view of the first transport unit that performs a first cleaning operation.

As illustrated in FIG. 6, the control unit 27 may be capable of performing a first cleaning operation of the first transport unit 46*f* and a second cleaning operation of the second transport unit 46*s*. The control unit 27 may perform the first cleaning operation and the second cleaning operation at different timings. The control unit 27 may perform the cleaning operation of the first transport unit 46*f* after the medium 19 has passed through the first transport unit 46*f*. The control unit 27 may perform the first cleaning operation while the second transport unit 46*s* is transporting the medium 19.

In the first cleaning operation, the first roller 52*f* is rotated in a state in which the first roller 52*f* and the first facing member 53*f* are separated from each other. In the second cleaning operation, the second roller 52*s* is rotated in a state in which the second roller 52*s* and the second facing member 53*s* are separated from each other.

The control unit 27 rotates the first roller 52*f* and the second roller 52*s* in the forward rotation direction Df during the cleaning operation. In other words, the control unit 27 rotates the first roller 52*f* and the second roller 52*s* so that the bottom 58 of the groove 57 precedes the mouth 59 of the groove 57. When the first roller 52*f* and the second roller 52*s* rotate, the foreign material 61 adhering to each of the first roller 52*f* and the second roller 52*s* is separated from the first roller 52*f* and the second roller 52*s* by the centrifugal force acting on the foreign material 61.

During the first cleaning operation, the control unit 27 may cause the first roller 52*f* to rotate in the forward rotation direction Df, from a state in which the first roller 52*f* is decelerated. In other words, as shown in FIG. 5, the control unit 27 may perform the cleaning operation by performing the acceleration control after the deceleration control. At this time, the cleaning operation may be performed by performing the acceleration control after the second deceleration control in which the second speed V2 is 0. During the first cleaning operation, the control unit 27 may rotate the first roller 52*f* in the forward rotation direction Df, from a state in with the first roller 52*f* is stopped. The control unit 27 may rotate the first roller 52*f* in the forward rotation direction Df, from a state in which the first roller 52*f* rotates in the reverse rotation direction.

Figure 7:
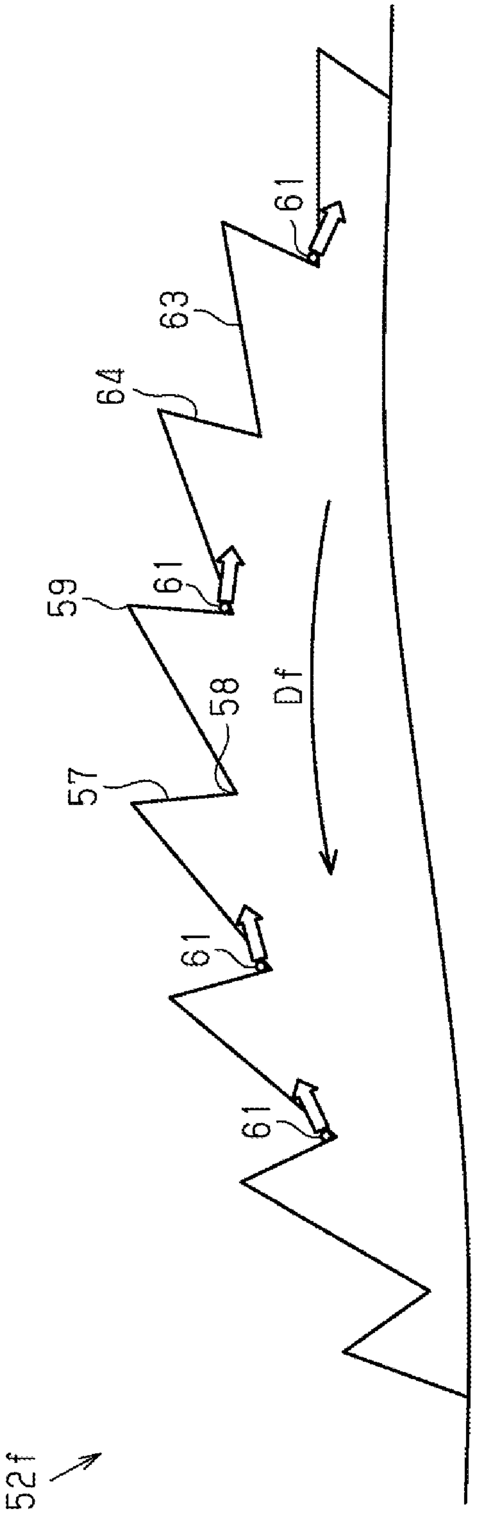
FIG. 7 is an enlarged schematic view of a first transport roller.

As illustrated in FIG. 7, of side walls of the groove 57 coupling the bottom 58 and the mouth 59, a portion located rearward in the forward rotation direction Df is also referred to as a rear wall 63, and a portion located forward in the forward rotation direction Df is also referred to as a front wall 64. The inclination of the rear wall 63 with respect to the forward rotation direction Df may be gentler than the inclination of the front wall 64 with respect to the forward rotation direction Df.

When the first roller 52*f* is rotated in the forward rotation direction Df from the state of being stopped or rotating in the reverse rotation direction, an inertia force acts on the foreign material 61. In FIG. 7, the inertia force acting on the foreign material 61 is indicated by white arrows. The direction of the inertia force acting on the foreign material 61 is opposite to the forward rotation direction Df. With respect to the direction in which the inertial force acts, the inclination of the rear wall 63 is smaller than the inclination of the front wall 64. Thus, for example, compared to a case in which the first roller 52*f* rotating in the forward rotation direction Df is rotated in the reverse rotation direction, the foreign material 61 adhering to the groove 57 is easily separated from the first roller 52*f* by the actions of the centrifugal force and the inertia force.

As illustrated in FIG. 6, the first detector 47*f* detects the medium 19 at a first position P1, which is an example of a predetermined position between the first transport unit 46*f* and the second transport unit 46*s* in the transport direction D. Based on a detection result of the first detector 47*f*, the control unit 27 can detect a delay in transport at the first position P1.

The second detector 47*s* detects the medium 19 at a second position P2 downstream of the second transport unit 46*s* in the transport direction D. The control unit 27 can detect the delay in transport at the second position P2 based on a detection result of the second detector 47*s*.

The control unit 27 may perform the first cleaning operation when the delay in transport is detected at the first position P1. When the control unit 27 detects the delay in transport at the second position P2, the control unit 27 may perform the second cleaning operation of the second transport unit 46*s* located between the first position P1 and the second position P2.

Cleaning Method

As illustrated in FIG. 3, the first roller 52*f* transports the medium 19 by rotating while nipping the medium 19 between the first roller 52*f* and the first facing member 53*f*. The first transport unit 46*f* transfers the transported medium 19 to the second transport unit 46*s*. The second roller 52*s* transports the medium 19 by rotating while nipping the medium 19 between the second roller 52*s* and the second facing member 53*s*.

As illustrated in FIG. 6, the control unit 27 drives the first displacement unit 55*f* to relatively separate the first roller 52*f* and the first facing member 53*f* from each other. The control unit 27 performs the first cleaning operation of rotating the first roller 52*f* in the state in which the first roller 52*f* and the first facing member 53*f* are separated from each other. When the first cleaning operation ends, the control unit 27 causes the first roller 52*f* and the first facing member 53*f* to come into contact with each other.

The control unit 27 drives the second displacement unit 55*s* to relatively separate the second roller 52*s* and the second facing member 53*s* from each other. The control unit 27 performs the second cleaning operation of rotating the second roller 52*s* in the state in which the second roller 52*s* and the second facing member 53*s* are separated from each other. When the second cleaning operation ends, the control unit 27 causes the second roller 52*s* and the second facing member 53*s* to come into contact with each other.

Actions of Embodiment

Actions of the embodiment will be described.

When the recording is performed on the plurality of media 19, the control unit 27 may perform the deceleration control or the cleaning operation on the separation unit 45 and the transport unit 46 located between the medium 19 and the medium 19. For example, when there is no delay in the transport of the medium 19, the control unit 27 may perform the deceleration control. For example, when a delay occurs in the transport of the medium 19, the control unit 27 may perform the cleaning operation. The control unit 27 may perform the cleaning operation when a predetermined time period has elapsed from the previous cleaning operation, or when a predetermined number of sheets have been transported after the previous cleaning operation.

Effects of Embodiment

Effects of the embodiment will be described.

(1-1) The control unit 27 decelerates the first roller 19*f* between the first medium 19*s* and the second medium 52*f*, which are continuously transported. Therefore, power consumption can be reduced compared to a case in which the first roller 52*f* is rotated at the first speed V1 until the transport of the plurality of media 19 is completed, for example.

(1-2) The control unit 27 determines whether to perform the deceleration control, based on the distance L between the media 19, and the first speed V1. Therefore, for example, by performing the deceleration control when the time period for decelerating the speed from the first speed V1 to the second speed V2 can be secured, it is possible to suppress a deterioration in throughput.

(1-3) The deceleration control includes the first deceleration control and the second deceleration control. In other words, the control unit 27 can perform the first deceleration control and the second deceleration control, as the deceleration control. In the first deceleration control, the second speed V2 is greater than 0. In the second deceleration control, the second speed V2 is 0. Thus, the first deceleration control can be performed in a shorter time period than that of the second deceleration control. The second deceleration control can reduce the power consumption more effectively than the first deceleration control.

(1-4) The control unit 27 determines which of the first deceleration control and the second deceleration control is to be performed based on the distance L between the media 19, and the first speed V1. Therefore, the control unit 27 can appropriately decelerate the first roller 52*f* in accordance with the transport of the media 19.

(1-5) In the first deceleration control, the second speed V2 is changeable in the stepless manner. Therefore, for example, compared to a case in which the second speed V2 is changed in a discrete manner, it becomes easier to balance the power consumption and the throughput.

(1-6) The foreign material 61 such as paper dust may adhere to the first roller 52*f*. In this regard, the acceleration rate at the time of accelerating the first roller 52*f* is greater than the absolute value of the acceleration rate at the time of decelerating the first roller 52*f*. Thus, the inertia force applied to the foreign material 61 adhering to the first roller 52*f* can be increased, and the foreign material 61 can be separated from the first roller 52*f*.

(1-7) The control unit 27 causes the first roller 52*f* to accelerate from the second speed V2 to the third speed V3. Therefore, for example, compared to a case in which the first roller 52*f* is accelerated from the second speed V2 to the first speed V1, the inertia force applied to the foreign material 61 adhering to the first roller 52*f* can be increased, and the foreign material 61 can be separated from the first roller 52*f*.

(1-8) While the second roller 52*s* is transporting the first medium 19*f*, the control unit 27 decelerates the first roller 52*f*. Therefore, even when the medium 19 is transported in the transport direction D by the first roller 52*f* and the second roller 52*s*, the power consumption can be reduced.

(1-9) The control unit 27 determines whether to perform the deceleration control, based on the recording condition. Specifically, for example, the control unit 27 may determine to perform the deceleration control when the image quality is prioritized in the recording, and to not perform the deceleration control when the speed is prioritized in the recording. By setting the condition for performing the deceleration control in advance, it is possible to easily determine whether to perform the deceleration control.

(1-10) The control unit 27 determines whether to perform the deceleration control, based on execution of the maintenance of the recording unit 30. Specifically, for example, it may be determined that the deceleration control is performed when the maintenance is performed after the recording on the first medium 19*f* and before the recording on the second medium 19*s*, and the deceleration control is not performed when the maintenance is not performed. By setting the condition for performing the deceleration control in advance, it is possible to easily determine whether to perform the deceleration control.

(1-11) The control unit 27 determines whether to perform the deceleration control, based on the post-processing condition. Specifically, for example, the control unit 27 may determine to perform the deceleration control when the post-processing is performed, and to not perform the deceleration control when the post-processing is not performed. By setting the condition for performing the deceleration control in advance, it is possible to easily determine whether to perform the deceleration control.

(1-12) The foreign material 61 such as paper dust adhering to the first roller 52*f* is separated from the first roller 52*f* by the centrifugal force generated by the rotation of the first roller 52*f*. The first roller 52*f* rotates in a state of being separated from the first facing member 53*f*. Therefore, it is possible to clean the first roller 52*f* while reducing damage to the first roller 52*f* and the first facing member 53*f*.

(1-13) During the cleaning operation, the control unit 27 rotates the first roller 52*f* at a speed faster than the first speed V1 at which the medium 19 is transported. Therefore, for example, compared to a case in which the first roller 52*f* is rotated at the same speed as the first speed V1 at which the medium 19 is transported, the first roller 52*f* can be efficiently cleaned by a larger centrifugal force.

(1-14) Since the plurality of grooves 57 are formed in the surface of the first roller 52*f*, slippage between the first rollers 52*f* and the medium 19 can be reduced. Since the plurality of grooves 57 are formed with the directions of openings of the grooves 57 aligned with each other, rotating the first roller 52*f* in accordance with the directions of openings makes it possible to reduce the possibility of the foreign material 61 entering deep into the groove 57.

(1-15) In the cleaning operation, the first roller 52*f* rotates in the forward rotation direction Df from the state of being stopped or of rotating in the reverse rotation direction. Therefore, for example, compared to a case in which the rotation speed of the first roller 52*f* rotating in the forward rotation direction Df is increased, it is possible to increase the inertia force applied to the foreign material 61 adhering to the first roller 52*f*. Therefore, the cleaning of the first roller 52*f* can be efficiently performed.

(1-16) The first facing member 53*f* is the toothed roller. When the first roller 52*f* rotates while being in contact with the toothed roller, the first roller 52*f* may be significantly damaged. However, since the first roller 52*f* rotates in a state of being separated from the toothed roller, it is possible to clean the first roller 52*f* while reducing damage to the first roller 52*f*.

(1-17) For example, when the first cleaning operation and the second cleaning operation are performed at the same time, operation noise becomes large. In this regard, the control unit 27 performs the second cleaning operation at a timing different from that of the first cleaning operation. Therefore, it is possible to reduce the operation noise generated when cleaning the first roller **52*f* and the second roller 52*s***.

(1-18) The first cleaning operation is performed while the second transport unit **46*s* is transporting the medium 19. The second transport unit 46*s* is provided downstream of the first transport unit 46*f* in the transport direction D. The medium 19 transferred from the first transport unit 46*f* to the second transport unit 46*s* is transported by the second transport unit 46*s*. In other words, while the second transport unit 46*s* is transporting the medium 19, the first transport unit 46*f* can release the nipping of the medium 19. Therefore, the throughput can be improved compared to a case in which the first cleaning operation is performed after the second transport unit 46*s* finishes transporting the medium 19**, for example.

(1-19) When the foreign material 61 adheres to the first roller **52*f*, the first roller 52*f* may slip with respect to the medium 19, and the delay in transport may occur. In this regard, the control unit 27 performs the first cleaning operation when the delay in transport is detected at the first position P1. In other words, the control unit 27 rotates the first roller 52*f* located upstream of the first position P1**. Therefore, it is possible to perform the cleaning operation after selecting the roller that needs cleaning.

(1-20) The foreign material 61 can be more effectively removed by the centrifugal force when no liquid adheres to the foreign material 61 than when the liquid adheres to the foreign material 61. In this regard, since the first roller **52*f* transports the media 19 before the recording, the foreign material 61** can be more efficiently removed.

(1-21) By decelerating the first roller **52*f*, it is possible to reduce noise such as rotation noise compared to a case in which the speed of the first roller 52*f*** is maintained, for example.

(1-22) When the first roller **52*f* rotates in a state of being in contact with the first facing member 53*f*, the first facing member 53*f* also rotates together with the first roller 52*f*, and thus the operation noise becomes louder. In this regard, since, in the cleaning operation, the first roller 52*f* rotates in the state of being separated from the first facing member 53*f***, it is possible to suppress the operation noise generated by the cleaning operation.

MODIFIED EXAMPLES

The embodiment can be modified and implemented as follows. The embodiment and the following modified examples can be implemented in combination with each other within a range in which no technical contradictions arise.

- The control unit 27 may perform the deceleration control on the transport unit 46 located furthest downstream in the transport direction D. The control unit 27 may perform the cleaning operation of the transport unit 46 located furthest downstream in the transport direction D. In other words, the medium transport device 29 need not necessarily include the second roller **52*s***.
- The control unit 27 may perform the deceleration control of the first roller **52*f* after the first medium 19*f* has passed through the second roller 52*s***.
- The control unit 27 may perform the cleaning operation of the first roller **52*f* after the first medium 19*f* has passed through the second roller 52*s***.
- The control unit 27 may perform the deceleration control on some of the plurality of transport units 46.
- The control unit 27 may perform the cleaning operation on some of the plurality of transport units 46.
- The feed roller 44, which is an example of the roller, may be capable of coming into contact with the medium accommodation unit 17, which is an example of the facing member. For example, the medium accommodation unit 17 may include a hopper that pushes up the accommodated medium 19. The feed roller 44 may be capable of coming into contact with the hopper in a state in which the medium 19 is not accommodated therein. The displacement unit 55 may move the feed roller 44. The control unit 27 may perform cleaning of the feed roller 44 by rotating the feed roller 44 in a state in which the feed roller 44 is separated from the medium 19 and the medium accommodation unit 17. The feed roller 44 may be an example of the first roller **52*f*, and the separation driving roller 49 may be an example of the second roller 52*s***.

The displacement unit 55 may move the first roller **52*f*. For example, in a state in which the second transport unit 46*s* is transporting the medium 19, the control unit 27 may move the first roller 52*f* away from the medium 19 and also perform the first cleaning operation of the first roller 52*f*. The control unit 27 may perform the first cleaning operation in a state in which the rear end of the medium 19 is located upstream of the first roller 52*f***.

- The control unit 27 need not necessarily perform the acceleration control during a gap in the transport of each of the media 19.
- The control unit 27 may set the absolute value of the acceleration rate applied when decelerating the speed from the first speed V1 to the second speed V2, to be the same as the acceleration rate applied when accelerating the speed from the second speed V2 to the third speed V3.
- The separation driven roller 50 may be a pad that nips the medium 19 between the separation driven roller 50 and the separation driving roller 49.
- The first roller **52*f* may transport the medium 19 that has been subjected to recording by the recording unit 30**.
- The control unit 27 may perform the cleaning operation for the plurality of transport units 46 at the same timing. The control unit 27 may perform the first cleaning operation and the second cleaning operation at the same timing.
- The surfaces of the first roller **52*f* and the second roller 52*s* may be smoothly formed. The grooves 57 need not necessarily be formed in the surfaces of the first roller 52*f* and the second roller 52*s***.
- The control unit 27 may perform the cleaning operation by causing the first roller **52*f* and the second roller 52*s*** to rotate in the reverse rotation direction.
- The control unit 27 may perform the cleaning operation by accelerating the first roller **52*f* to the third speed V3, from a state in which the first roller 52*f* rotating at the first speed V1 has been decelerated. In other words, the control unit 27** may perform the cleaning operation by performing the acceleration control after the first deceleration control.
- The control unit 27 may cause the first roller **52*f* to rotate at the first speed V1 during the cleaning operation. The first roller 52*f* may be cleaned by being accelerated from the stopped state to the first speed V1**, for example.
- The load applied to the motor that drives the transport unit 46 is different between when the transport unit 46 transports the medium 19 and when the transport unit 46 does not nip the medium 19, for example. Thus, based on the load applied to the motor, the control unit 27 may detect a delay in the transport of the medium 19.

The medium transport device 29 may be provided in a supply device that supplies the medium 19 to the recording device 13. The medium transport device 29 may be provided in the intermediate device 14. The medium transport device 29 may be provided in the post-processing device 15. Further, the medium transport device 29 may be provided in an image reading device such as a scanner or an automatic document feeder (ADF).

The recording device 13 is not limited to the ink jet-type printer, and may be a laser printer, a thermal printer, a dot impact printer, a digital printing machine, or the like.

The recording device 13 may be a liquid jetting device that jets or ejects a liquid other than ink to perform recording. The state of the liquid ejected from the liquid jetting device in the form of a minute amount of liquid droplets is assumed to include a particulate form, a teardrop form, and a trailing thread-like form. The liquid herein may be any material that can be jetted from the liquid jetting device. For example, the liquid may be any matter in a state of being in a liquid phase, and is assumed to include a liquid body having high or low viscosity, as well as a fluid body such as sol, gel water, other inorganic solvents, an organic solvent, a solution, a liquid resin, a liquid metal, and a metal melt. The liquid includes not only liquid as a single state of the substance, but also includes particles of a functional material made of a solid such as pigment or metal particles dissolved in a solvent, dispersed or mixed in a solvent, and the like. Typical examples of the liquid include ink described in the embodiment above and liquid crystal. Here, ink is assumed to include a general aqueous ink and a solvent ink, as well various liquid compositions such as gel ink and hot-melt ink. Examples of the liquid jetting device include a device that jets a liquid including, in a dispersed or dissolved form, a material such as an electrode material and a color material used in manufacture of liquid crystal displays, electroluminescent displays, surface emitting displays, color filters and the like in a dispersed or dissolved form. The liquid jetting device may be a device that jets bioorganic substances used for biochip manufacturing, a device that is used as a precision pipette and jets a liquid to be a sample, a textile printing device, a micro dispenser, or the like. The liquid jetting device may be a device that jets lubricant to a precision machine such as a clock or a camera in a pinpoint manner, or a device that jets a transparent resin liquid such as ultraviolet curable resin or the like on a substrate for forming a hemispherical micro-lens, an optical lens, or the like used for an optical communication element and the like. The liquid jetting device may be a device that jets an etching liquid such as an acid or an alkali for etching a substrate or the like.

Definition

As used herein, the phrase "at least one of" means one or more of specific alternatives. As an example, the phrase "at least one of" as used herein means only one alternative or both of two alternatives, when the number of alternatives is two. As another example, the phrase "at least one of" as used herein means only one alternative, or any combination of two or more alternatives, when the number of alternatives is three or more.

Additional Notes

The technical ideas and effects obtained from the above-described embodiments and modified examples will be described below.

(A) A medium transport device includes a first roller configured to transport a medium in a transport direction, and a control unit configured to control the first roller. The control unit rotates the first roller at a first speed when the first roller transports a first medium, and is configured to perform a deceleration control of decelerating a rotation of the first roller to a second speed slower than the first speed when a rear end of the first medium is located downstream of the first roller in the transport direction and a leading end of a second medium transported subsequently to the first medium is located upstream of the first roller in the transport direction. This idea A can be implemented in combination with ideas to be described below within a range in which no technical contradictions arise.

According to this configuration, the control unit decelerates the first roller between the first medium and the second medium, which are continuously transported. Therefore, power consumption can be reduced compared to a case in which the first roller is rotated at the first speed until the transport of the plurality of media is completed.

(B) In the medium transport device, based on a distance between the rear end of the first medium and the leading end of the second medium, and on the first speed, the control unit may determine whether to perform the deceleration control. This idea B may be combined with the idea A described above.

According to this configuration, the control unit determines whether to perform the deceleration control, based on the distance between the media, and the first speed. Therefore, for example, by performing the deceleration control when the time period for decelerating the speed from the first speed to the second speed can be secured, it is possible to suppress a deterioration in throughput.

(C) In the medium transport device, the deceleration control may include a first deceleration control of setting the second speed to a speed greater than 0, and a second deceleration control of setting the second speed to 0.

According to this configuration, the deceleration control includes the first deceleration control and the second deceleration control. In other words, the control unit 27 can perform the first deceleration control and the second deceleration control, as the deceleration control. In the first deceleration control, the second speed is greater than 0. In the second deceleration control, the second speed is 0. Thus, the first deceleration control can be performed in a shorter time period than that of the second deceleration control. The second deceleration control can reduce the power consumption more effectively than the first deceleration control. This idea C may be combined with the idea A or the idea B described above.

(D) In the medium transport device, based on a distance between the rear end of the first medium and the leading end of the second medium, and on the first speed, the control unit may determine whether to perform the first deceleration control or the second deceleration control. This idea D may be combined with the idea C described above.

According to this configuration, the control unit determines which of the first deceleration control and the second deceleration control is to be performed, based on the distance between the media, and the first speed. Therefore, the control unit can appropriately decelerate the first roller in accordance with the transport of the media.

(E) In the medium transport device, in the first deceleration control, the second speed may be changeable in a stepless manner. This idea E may be combined with the idea A or the idea B described above.

According to this configuration, in the first deceleration control, the second speed is changeable in the stepless manner. Therefore, for example, compared to a case in which the second speed is changed in a discrete manner, it becomes easier to balance the power consumption and the throughput.

(F) In the medium transport device, when accelerating, to the first speed, the first roller decelerated to the second speed, the control unit may accelerate the first roller at an acceleration rate greater than an absolute value of an acceleration rate applied when decelerating the first roller from the first speed to the second speed. This idea F may be combined with any one of the ideas A to E described above.

A foreign material such as paper dust may adhere to the first roller. In this regard, according to this configuration, the acceleration rate at the time of accelerating the first roller is greater than the absolute value of the acceleration rate at the time of decelerating the first roller. Thus, an inertia force applied to the foreign material adhering to the first roller can be increased, and the foreign material can be separated from the first roller.

(G) In the medium transport device, the control unit may be configured to perform, after performing the deceleration control, an acceleration control of rotating the first roller at a third speed faster than the first speed when the leading end of the second medium is located upstream of the first roller in the transport direction. This idea G may be combined with any one of the ideas A to F described above.

According to this configuration, the control unit accelerates the first roller from the second speed to the third speed. Therefore, for example, compared to a case in which the first roller is accelerated from the second speed to the first speed, the inertia force applied to the foreign material adhering to the first roller can be increased, and the foreign material can be separated from the first roller.

(H) The medium transport device may further include a second roller downstream of the first roller in the transport direction, the second roller being configured to transport the medium in the transport direction. The control unit may further control the second roller, and may perform the deceleration control while the second roller is transporting the first medium. This idea H may be combined with any one of the ideas A to G described above.

According to this configuration, the control unit decelerates the first roller while the second roller is transporting the first medium. Therefore, even when the medium is transported in the transport direction D by the first roller and the second roller, the power consumption can be reduced.

(I) A recording device includes the medium transport device having the configuration described above, and a recording unit configured to perform recording on the medium transported by the medium transport device. Based on a recording condition, the control unit determines whether to perform the deceleration control. This idea I may be combined with any one of the ideas A to H described above.

According to this configuration, the control unit determines whether to perform the deceleration control, based on the recording condition. Specifically, for example, the control unit may determine to perform the deceleration control when the image quality is prioritized in the recording, and to not perform the deceleration control when the speed is prioritized in the recording. By setting the condition for performing the deceleration control in advance, it is possible to easily determine whether to perform the deceleration control.

(J) A recording device includes the medium transport device having the configuration described above, and a recording unit configured to perform recording by ejecting a liquid onto the medium transported by the medium transport device. The control unit is configured to perform maintenance of the recording unit, and based on execution of the maintenance, determines whether to perform the deceleration control. This idea J may be combined with any one of the ideas A to I described above.

According to this configuration, the control unit determines whether to perform the deceleration control, based on the execution of the maintenance. Specifically, for example, it may be determined that the deceleration control is performed when the maintenance is performed after the recording on the first medium and before the recording on the second medium, and the deceleration control is not performed when the maintenance is not performed. By setting the condition for performing the deceleration control in advance, it is possible to easily determine whether to perform the deceleration control.

(K) A recording system includes a recording device including the medium transport device having the configuration described above and a recording unit configured to perform recording on the medium transported by the medium transport device; and a post-processing device configured to perform post-processing on the medium subjected to recording by the recording device. Based on a post-processing condition, the control unit determines whether to perform the deceleration control. This idea K may be combined with any one of the ideas A to J described above.

According to this configuration, the control unit determines whether to perform the deceleration control, based on the post-processing condition. Specifically, for example, the control unit may determine to perform the deceleration control when the post-processing is performed, and to not perform the deceleration control when the post-processing is not performed. By setting the condition for performing the deceleration control in advance, it is possible to easily determine whether to perform the deceleration control.

(L) A recording device includes the medium transport device having the configuration described above, and a recording unit configured to perform recording by ejecting a liquid onto the medium transported by the medium transport device. This idea L may be combined with any one of the ideas A to H described above.

According to this configuration, the same effect as that of the medium transport device described above can be obtained.

(M) A recording system includes the recording device having the configuration described above, and a post-processing device configured to perform post-processing on the medium subjected to recording by the recording device. This idea M may be combined with the idea L described above.

According to this configuration, the same effect as that of the medium transport device described above can be obtained.

(N) A medium transport method includes transporting a first medium in a transport direction by rotating a first roller at a first speed; and decelerating the first roller to a second speed slower than the first speed when a rear end of the first medium is located downstream of the first roller in the transport direction and a leading end of a second medium transported subsequently to the first medium is located upstream of the first roller in the transport direction.

According to this method, the same effect as that of the medium transport device described above can be obtained.

(O) A medium transport device is a medium transport device configured to transport a medium using a roller and a facing member facing the roller. The medium transport device includes a displacement unit configured to cause the roller and the facing member to be relatively separated from each other and brought into contact with each other, and a control unit. The control unit is configured to perform a cleaning operation of rotating the roller in a state in which the roller and the facing member are separated from each other. This idea O can be implemented in combination with ideas to be described below within a range in which no technical contradictions arise.

A foreign material such as paper dust adhering to the roller is separated from the roller by a centrifugal force generated by the rotation of the roller. According to this configuration, the roller rotates in the state of being separated from the facing member. Therefore, it is possible to clean the roller while reducing damage to the roller and the facing member.

(P) In the medium transport device, the control unit may rotate the roller at a transport speed when transporting the medium, and may rotate the roller at a speed faster than the transport speed during the cleaning operation. This idea P may be combined with the idea O described above.

According to this configuration, during the cleaning operation, the control unit rotates the roller at the speed faster than the transport speed of the medium. Therefore, for example, compared to a case in which the roller is rotated at the same speed as the transport speed of the medium, the roller can be efficiently cleaned by a larger centrifugal force.

(Q) In the medium transport device, a plurality of grooves may be formed in a surface of the roller with directions of openings of the grooves aligned with each other, and during the cleaning operation, the control unit may rotate the roller in a direction in which a bottom of the groove precedes a mouth of the groove. This idea Q may be combined with the idea O or the idea P described above.

According to this configuration, since the plurality of grooves are formed in the surface of the roller, slippage between the roller and the medium can be reduced. Since the plurality of grooves are formed with the directions of openings of the grooves aligned with each other, rotating the roller in accordance with the directions of openings makes it possible to reduce the possibility of the foreign material entering deep into the groove.

(R) In the medium transport device, during the cleaning operation, the control unit may rotate the roller in a forward rotation direction from a state in which the roller is stopped or is rotating in a reverse rotation direction opposite to the forward rotation direction. This idea R may be combined with any one of the ideas O to Q described above.

According to this configuration, during the cleaning operation, the roller rotates in the forward rotation direction from the state of being stopped or of rotating in the reverse rotation direction. Therefore, for example, compared to a case in which the rotation speed of the roller rotating in the forward rotation direction is increased, it is possible to increase an inertia force applied to the foreign material adhering to the roller. Therefore, the cleaning of the roller can be efficiently performed.

(S) In the medium transport device, the facing member may be a toothed roller including, on a circumferential surface thereof, a plurality of teeth configured to come into point contact with the medium. This idea S may be combined with any one of the ideas O to R described above.

According to this configuration, the facing member is the toothed roller. When the roller rotates while being in contact with the toothed roller, the roller may be significantly damaged. However, since the roller rotates in a state of being separated from the toothed roller, it is possible to clean the roller while reducing damage to the roller.

(T) When the roller is defined as a first roller, the facing member is defined as a first facing member, the displacement unit is defined as a first displacement unit, and the cleaning operation is defined as a first cleaning operation, the medium transport device may include a first transport unit configured to transport the medium using the first roller and the first facing member, a second transport unit provided downstream of the first transport unit in a transport direction and configured to transport the medium using a second roller and a second facing member, and a second displacement unit configured to cause the second roller and the second facing member to be relatively separated from each other and brought into contact with each other. The control unit may perform a second cleaning operation of rotating the second roller in a state in which the second roller and the second facing member are separated from each other, at a timing different from that of the first cleaning operation. This idea T may be combined with any one of the ideas O to S described above.

For example, when the first cleaning operation and the second cleaning operation are performed at the same time, operation noise becomes large. In this regard, according to this configuration, the control unit performs the second cleaning operation at the timing different from that of the first cleaning operation. Therefore, it is possible to reduce the operation noise generated when cleaning the first roller and the second roller.

(U) In the medium transport device, the control unit may perform the first cleaning operation while the second transport unit is transporting the medium. This idea U may be combined with the idea T described above.

According to this configuration, the first cleaning operation is performed while the second transport unit is transporting the medium. The second transport unit is provided downstream of the first transport unit in the transport direction. The medium transferred from the first transport unit to the second transport unit is transported by the second transport unit. In other words, while the second transport unit is transporting the medium, the first transport unit can release the medium. Therefore, the throughput can be improved compared to a case in which the first cleaning operation is performed after the second transport unit finishes transporting the medium, for example.

(V) In the medium transport device, the control unit may be configured to detect a delay in transport at a predetermined position between the first transport unit and the second transport unit in the transport direction, and may perform the first cleaning operation when the delay in transport is detected at the predetermined position. This idea V may be combined with the idea T or the idea U described above.

When the foreign material adheres to the roller, the roller may slip with respect to the medium, and the delay in transport may occur. In this regard, according to this configuration, when detecting the delay in transport at the predetermined position, the control unit performs the first cleaning operation. In other words, the control unit rotates the first roller located upstream of the predetermined position. Therefore, it is possible to perform the cleaning operation after selecting the roller that needs cleaning.

(W) A recording device includes the medium transport device having the configuration described above, and a recording unit configured to perform recording by ejecting a liquid onto the medium transported by the medium transport device. The roller transports the medium before the recording by the recording unit. This idea W may be combined with any one of the ideas O to S described above.

The foreign material can be more effectively removed by the centrifugal force when no liquid adheres to the foreign material than when the liquid adheres to the foreign material. In this regard, according to this configuration, since the roller transports the medium before the recording by the recording unit, it is possible to effectively remove the foreign material.

(X) A recording device includes the medium transport device having the configuration described above, and a recording unit configured to perform recording by ejecting a liquid onto the medium transported by the medium transport device. The first roller transports the medium before the recording by the recording unit. This idea X may be combined with any one of the ideas T to W described above.

According to this configuration, the same effect as that of the recording device described above can be obtained.

(Y) A cleaning method includes transporting a medium by rotating a roller configured to come into contact with a facing member, with the medium nipped between the roller and the facing member; causing the roller and the facing member to be relatively separated from each other; and performing a cleaning operation of rotating the roller in a state in which the roller and the facing member are separated from each other. This idea Y may be combined with an idea Z described below.

According to this method, the same effect as that of the medium transport device described above can be obtained.

(Z) When the roller is defined as a first roller, the facing member is defined as a first facing member, and the cleaning operation is defined as a first cleaning operation, the cleaning method may include transporting the medium by rotating a second roller provided downstream of the first facing member in a transport direction and configured to come into contact with a second facing member, with the medium nipped between the second roller and the second facing member; causing the second roller and the second facing member to be relatively separated from each other; and performing a second cleaning operation of rotating the second roller in a state in which the second roller and the second facing member are separated from each other, at a timing different from that of the first cleaning operation.

According to this method, the same effect as that of the medium transport device described above can be obtained.

What is claimed is:

1. A medium transport device comprising:
- a first roller configured to transport a medium in a transport direction; and
- a control unit configured to control the first roller, wherein the control unit
  - rotates the first roller at a first speed when the first roller transports a first medium and
  - is configured to perform a deceleration control, the deceleration control comprising triggering deceleration of a rotation of the first roller to decelerate from the first speed to a second speed slower than the first speed, the triggering of deceleration occurring when a rear end of the first medium is located downstream of the first roller in the transport direction and a leading end of a second medium transported subsequently to the first medium is located upstream of the first roller in the transport direction.

2. The medium transport device according to claim 1, wherein
- based on a distance between the rear end of the first medium and the leading end of the second medium, and on the first speed, the control unit determines whether to perform the deceleration control.

3. The medium transport device according to claim 1, wherein the deceleration control includes
- a first deceleration control of setting the second speed to a speed greater than 0 and
- a second deceleration control of setting the second speed to 0.

4. The medium transport device according to claim 3, wherein
- based on a distance between the rear end of the first medium and the leading end of the second medium, and on the first speed, the control unit determines whether to perform the first deceleration control or the second deceleration control.

5. The medium transport device according to claim 4, wherein
- in the first deceleration control, the second speed is changeable in a stepless manner.

6. The medium transport device according to claim 1, wherein
- when accelerating, to the first speed, the first roller decelerated to the second speed, the control unit accelerates the first roller at an acceleration rate greater than an absolute value of an acceleration rate applied when decelerating the first roller from the first speed to the second speed.

7. The medium transport device according to claim 1, wherein
- the control unit is configured to perform, after performing the deceleration control, an acceleration control of rotating the first roller at a third speed faster than the first speed when the leading end of the second medium is located upstream of the first roller in the transport direction.

8. The medium transport device according to claim 1, further comprising
- a second roller downstream of the first roller in the transport direction, the second roller being configured to transport the medium in the transport direction, wherein
- the control unit
  - further controls the second roller and
  - performs the deceleration control while the second roller is transporting the first medium.

9. A recording device comprising:
- the medium transport device according to claim 1; and
- a recording unit configured to perform recording on the medium transported by the medium transport device, wherein
- based on a recording condition, the control unit determines whether to perform the deceleration control.

10. A recording device comprising:
- the medium transport device according to claim 1; and
- a recording unit configured to perform recording by ejecting a liquid onto the medium transported by the medium transport device, wherein
- the control unit is configured to perform maintenance of the recording unit and based on execution of the maintenance, determines whether to perform the deceleration control.

11. A recording system comprising:

a recording device including the medium transport device according to claim 1 and a recording unit configured to perform recording on the medium transported by the medium transport device; and a post-processing device configured to perform post-processing on the medium subjected to recording by the recording device, wherein based on a post-processing condition, the control unit determines whether to perform the deceleration control.

12. A recording device comprising:

the medium transport device according to claim 1; and a recording unit configured to perform recording by ejecting a liquid onto the medium transported by the medium transport device.

13. A recording system comprising:

the recording device according to claim 12; and a post-processing device configured to perform post-processing on the medium subjected to recording by the recording device.

14. A medium transport method comprising:

transporting a first medium in a transport direction by rotating a first roller at a first speed; and decelerating the first roller to a second speed slower than the first speed, the decelerating initiating when a rear end of the first medium is located downstream of the first roller in the transport direction and a leading end of a second medium transported subsequently to the first medium is located upstream of the first roller in the transport direction.

* * * * *